United States Patent
Zhang et al.

(10) Patent No.: US 9,438,715 B2
(45) Date of Patent: Sep. 6, 2016

(54) BROADCAST MODE CONTROL METHOD AND SYSTEM

(71) Applicant: Tencent Technology (Shenzhen) Company Limited, Shenzhen (CN)

(72) Inventors: Xiaolong Zhang, Shenzhen (CN); Bin Zhang, Shenzhen (CN); Xing Liang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 146 days.

(21) Appl. No.: 14/089,654

(22) Filed: Nov. 25, 2013

(65) Prior Publication Data

US 2014/0134994 A1 May 15, 2014

Related U.S. Application Data

(63) Continuation of application No. PCT/CN2013/077299, filed on Jun. 17, 2013.

(30) Foreign Application Priority Data

Oct. 23, 2012 (CN) .......................... 2012 1 0405991

(51) Int. Cl.
*H04M 3/42* (2006.01)
*H04M 1/60* (2006.01)

(52) U.S. Cl.
CPC ......... *H04M 1/605* (2013.01); *H04M 2250/12* (2013.01)

(58) Field of Classification Search
CPC ............. H04M 1/605; H04M 1/6041; H04M 1/6066; H04M 2250/12; H04M 1/03; H04M 1/6033; H04M 1/72519; H04W 4/02; H04W 4/008

USPC .................... 455/414.1, 418, 569.1
See application file for complete search history.

(56) References Cited

U.S. PATENT DOCUMENTS

2012/0086551 A1* 4/2012 Lowe .................... H04M 1/605
  340/6.1
2013/0276006 A1* 10/2013 Besehanic ........ H04N 21/44218
  725/12

FOREIGN PATENT DOCUMENTS

| CN | 1372752 | A | 10/2002 |
| CN | 1725767 | A | 1/2006 |
| CN | 101964844 | A | 2/2011 |
| CN | 102006362 | A | 4/2011 |
| CN | 102098483 | A | 6/2011 |
| JP | 2006157558 | A | 6/2006 |

OTHER PUBLICATIONS

Tencent Technology, ISR WO, PCT/CN2013/077299, Sep. 26, 2013, 7 pgs.
Tencent Technology, IPRP, PCT/CN2013/077299, Report date: Apr. 28, 2015, 5 pgs.

* cited by examiner

*Primary Examiner* — Allahyar Kasraian
(74) *Attorney, Agent, or Firm* — Morgan, Lewis & Bockius LLP

(57) ABSTRACT

Embodiments of the present invention disclose a method and an apparatus for controlling a play mode, and a mobile terminal. The method includes: detecting whether a mobile terminal is in a preset status according to an operation of a user on the mobile terminal; if the mobile terminal is in the preset status, acquiring a distance between the user and the mobile terminal; and if the distance between the user and the mobile terminal is smaller than a preset threshold, controlling the mobile terminal to enter an earphone play mode. Trough the present invention, the play mode of the mobile terminal can be effectively and accurately controlled, thereby avoiding unnecessary operations and improving the intelligence of the mobile terminal.

12 Claims, 4 Drawing Sheets

BROADCAST MODE CONTROL METHOD AND SYSTEM

RELATED APPLICATIONS

This application is a continuation application of PCT Patent Application No. PCT/CN2013/077299, entitled "A BROADCAST MODE CONTROL METHOD AND SYSTEM" filed on Jun. 17, 2013, which claims priority the benefit of Chinese Patent Application No. 201210405991.2 filed in China on Oct. 23, 2012, both of which are hereby incorporated by reference in their entirety.

FIELD OF THE INVENTION

The present invention relates to a mobile terminal technology, and more particularly, to a broadcast mode control method and system that is capable of controlling a play mode.

BACKGROUND OF THE INVENTION

With the development of mobile terminal technologies, the intelligence of a mobile terminal is in great demand. When playing voice data, it is important to reflect the intelligence of the mobile terminal such that the mobile terminal can automatically select a play mode according to an operation of a user. For example, a conventional mobile terminal is provided with an infrared sensor that is set at two sides or in a groove of an earphone of the mobile terminal. When the voice data is played, the infrared sensor transmits an infrared signal to detect a distance between the user and the mobile terminal, specifically a distance between the user and a screen surface of the mobile terminal. If the detected distance is smaller than a preset threshold, the mobile terminal determines that the user puts the mobile terminal closer to the ear of the user, and switches into an earphone play mode thereby using the earphone to output the voice data. If the detected distance is not within the preset threshold, the mobile terminal enters into a speaker play mode, and plays the voice data through the speaker. However, the conventional mobile terminal controls the play mode only through the distance between the user and the mobile terminal and may cause many undesirable operations. For example, if the hand of the user approaches the screen surface of the mobile terminal by accident, or the finger of the user covers the screen surface of the mobile terminal by accident, an unnecessary switchover operation of the play mode is triggered, and thus the accuracy of controlling the play mode is affected, more system resources are wasted, and the intelligence of the mobile terminal is deteriorated.

SUMMARY OF THE INVENTION

Accordingly, the present invention is directed to a broadcast mode control method and system that can substantially obviate one or more of the problems due to limitations and disadvantages of the related art.

An object of the present invention is to provide a method for controlling a play mode, including:

detecting whether a mobile terminal is in a preset status according to an operation of a user on the mobile terminal;

if the mobile terminal is in the preset status, acquiring a distance between the user and the mobile terminal; and if the distance between the user and the mobile terminal is smaller than a preset threshold, controlling the mobile terminal to enter an earphone play mode.

Another object of the present invention is to provide a system for controlling a play mode, including:

a status detection module, configured to detect whether a mobile terminal is in a preset status according to an operation of a user on the mobile terminal;

a distance acquisition module, configured to: when the mobile terminal is in the preset status, acquire a distance between the user and the mobile terminal; and a control module, configured to: when the distance between the user and the mobile terminal is smaller than a preset threshold, control the mobile terminal to enter an earphone play mode.

Still another object of the present invention is to provide a mobile terminal, including the apparatus for controlling a play mode.

In the embodiments of the present invention, the play mode of the mobile terminal is controlled based on the combination of the position status of the mobile terminal and the distance between the mobile terminal and the user into consideration. Because the influence from the position status of the mobile terminal by the operation of the user on the mobile terminal is considered together with the distance between the mobile terminal and the user, the user's requirement for the play mode can be certainly obtained, so that the play mode of the mobile terminal can be controlled more accurately and effectively, thereby avoiding unnecessary operations and improving the intelligence of the mobile terminal.

Additional features and advantages of the invention will be set forth in the description which follows, and in part will be apparent from the description, or may be learned by practice of the invention. The objectives and other advantages of the invention will be realized and attained by the structure and methodology particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
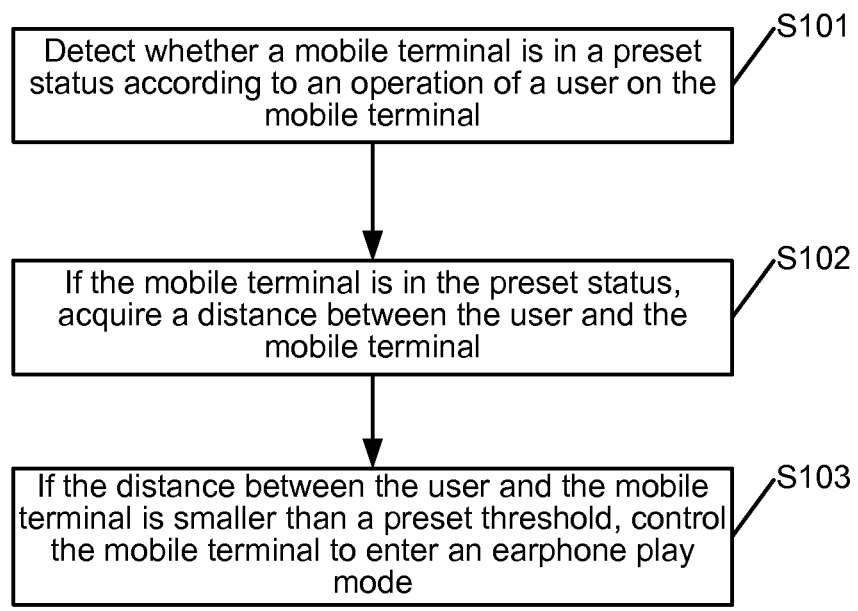
FIG. 1 is a flow chart of a method for controlling a play mode according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The solution for controlling a play mode according to the preferred embodiments of the present invention is applicable to various mobile terminals, where the mobile terminal may include a device such as a flat computer, a cell phone, a smart phone, an electronic reader, a laptop, a vehicle terminal and the like. Specifically, the embodiments of the present invention are capable of controlling a play mode in a mobile terminal system. For example, in a voice communication process, the mobile terminal is able to adopt an earphone mode or a speaker mode to play the communication voice according to the operation by a user. Also, in a process of performing a voice chat or leaving a voice message by using an instant communication application, the mobile terminal is able to adopt an earphone mode or a speaker mode to play the chatting voice or the message voice according to the operation by the user. The earphone of the mobile terminal may be an external earphone connected to the mobile terminal, and may also be a built-in earphone of the mobile terminal.

In the embodiments of the present invention, a position status of the mobile terminal refers to a position status of the screen surface of the mobile terminal relative to the horizontal plane. Such a position status may include a vertical status or a horizontal status. In other words, when the screen surface of the mobile terminal is vertical to the horizontal plane, the mobile terminal is in the vertical status, whereas when the screen surface of the mobile terminal is parallel to the horizontal plane, the mobile terminal is in the horizontal status. The operation of the user on the mobile terminal includes, but is not limited to, that the user moves the mobile terminal from the horizontal status to the vertical status, and that the user moves the mobile terminal from the vertical status to the horizontal status. In consideration of the user's habit, if the user wants to use the speaker to listen to the voice, in order to avoid that the louder voice played by the speaker hurts the eardrum of the user, the user usually keep the mobile terminal away from the ear, and the mobile terminal usually is usually placed in the horizontal status. If the user wants to use the earphone to listen to the voice, the user always raises the mobile terminal closer to the ear, and the mobile terminal is usually placed in the horizontal status. It is usual for the user to move the mobile terminal from the horizontal status to the vertical status. Therefore, in the embodiments of the present invention, the preset status is the vertical status, and the nonpreset status is the horizontal status. It should be noted that, in consideration of the different habits of the users, unless otherwise stated, the preset status in the embodiments of the present invention may refer to a non-horizontal status. That is, the preset status may be such that the screen surface of the mobile terminal is vertical or slopping to the horizontal plane.

A method for controlling a play mode according to an exemplary embodiment of the present invention is described in details below with reference to FIG. 1 and FIG. 2.

FIG. 1 is a flow chart of illustrating a method for controlling a play mode according to an exemplary embodiment of the present invention. As shown in FIG. 1, the method may include three steps: Step S101 to Step S103.

S101 detects whether a mobile terminal is in a preset status according to an operation by a user. At this step, a gravity sensor built in the mobile terminal is used to detect a gravity sensing signal generated by the mobile terminal when the user operates the mobile terminal. Then the gravity sensing signal is analyzed to determine a position status of the mobile terminal so as to judge whether the mobile terminal is in the preset status. In this exemplary embodiment, the built-in gravity sensor may be an accelerometer, a gyroscope, or the like. The gravity sensing signal may include a direction signal of the gravity acceleration of the mobile terminal, and a movement direction signal and movement status signal of the mobile terminal.

At S102, if the mobile terminal is in the preset status, a distance between the user and the mobile terminal is acquired. The preset status in this exemplary embodiment is the vertical status. The mobile terminal is provided with a distance sensor. For example, the distance sensor may be set at two sides or in a groove of the earphone of the mobile terminal, and is used to detect the distance between the user and the mobile terminal, specifically to detect the distance between the user and the screen surface of the mobile terminal, when the mobile terminal is in the vertical status. In this exemplary embodiment, the distance sensor may be an infrared sensor, a radar sensor, or any other sensors that can implement distance sensing. Specifically, the distance sensor can transmit a distance sensing signal vertically. When the distance sensing signal touches the skin of the user, the distance sensing signal is reflected back to the distance sensor so that the distance sensor can receive an echoed signal reflected by the user, thereby implementing distance sensing. In an actual application, the distance calculation formula such as the Doppler formula may be used to calculate the distance between the user and the mobile terminal based on the distance sensing signal and the echoed signal.

At S103, if the distance between the user and the mobile terminal is smaller than a preset threshold, the mobile terminal automatically switches into an earphone play mode. In this exemplary embodiment, the preset threshold may be set according to actual situations. For example, statistics can be made on the distance between the ear of the user and the mobile terminal when different users put the mobile terminal closer to the ear and use the earphone of the mobile terminal to listen to voice, and the maximum value obtained through the statistics may be set as the preset threshold, or the average value obtained through the statistics may be set as the preset threshold, and so on. In this step, if the distance between the user and the mobile terminal is smaller than the preset threshold, it is judged that the user wants to use the earphone of the mobile terminal to listen to the voice, and then the mobile terminal is controlled to enter the earphone play mode.

Figure 2:
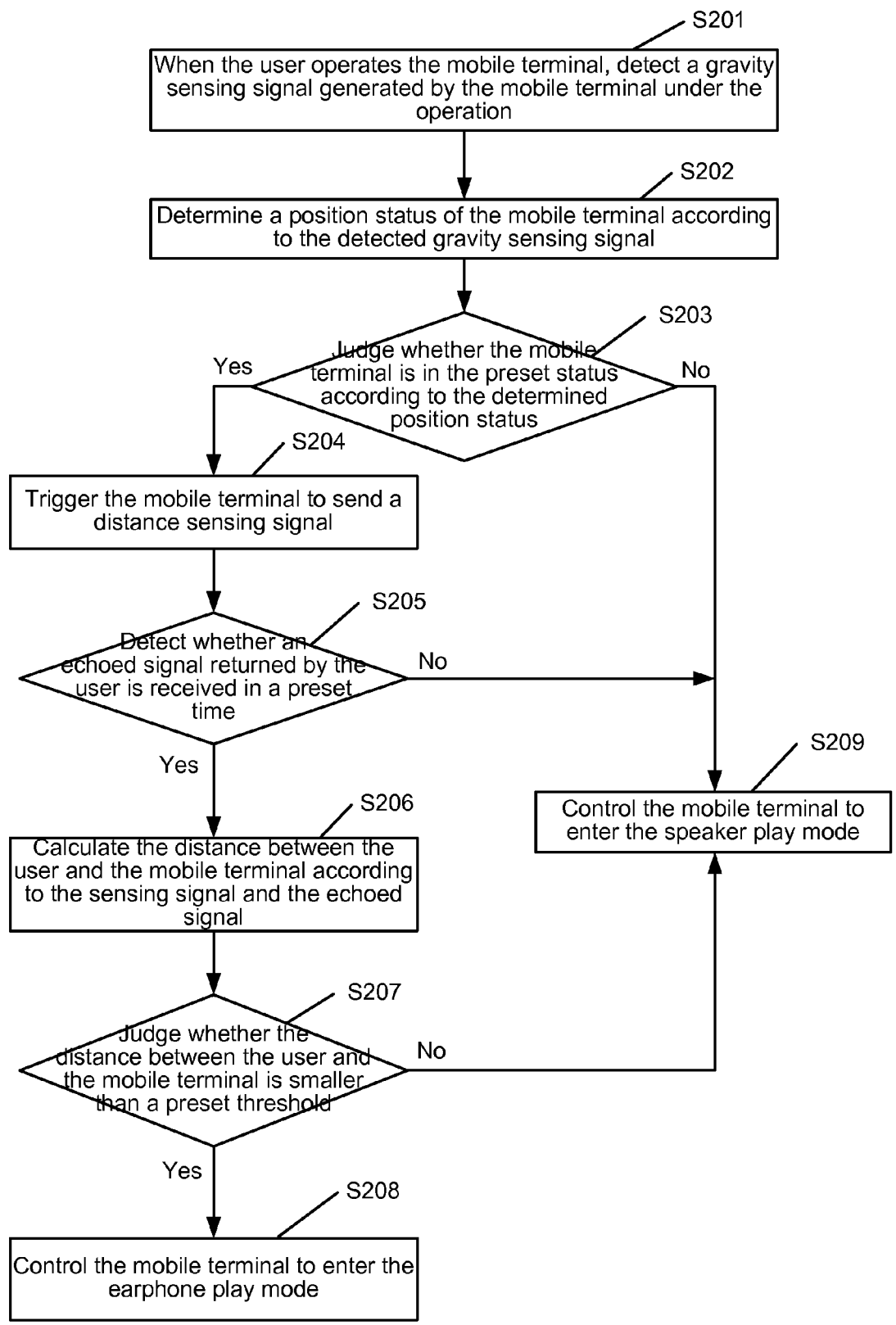
FIG. 2 is a flow chart of another method for controlling a play mode according to an embodiment of the present invention.

FIG. 2 is a flow chart of illustrating another method for controlling a play mode according to another exemplary embodiment of the present invention. As shown in FIG. 2, the method may include Step S201 to Step S209.

S201 detects a gravity sensing signal generated by the mobile terminal when the user operates the mobile terminal. At this step, a gravity sensor is built in the mobile terminal to detect the gravity sensing signal generated by the mobile terminal when the user operates the mobile terminal. In this exemplary embodiment, the gravity sensor may be an accelerometer, a gyroscope, or the like. The gravity sensing signal may include a direction signal of the gravity acceleration of the mobile terminal, a movement direction signal and movement status signal of the mobile terminal.

S202 determines a position status of the mobile terminal according to the detected gravity sensing signal such that the detected gravity sensing signal is analyzed and thereby the position status of the mobile terminal is detected.

S203 judges whether the mobile terminal is in a preset status according to the determined position status. For example, if it is judged that the mobile terminal is in the preset status, that is, the mobile terminal is in the vertical status in this exemplary embodiment, it is considered that the user performs an operation of moving the mobile terminal from the horizontal status to the vertical status. In other words, it is determined that the user raises the mobile terminal closer to the ear and intends to use the earphone of the mobile terminal to listen to the voice, and therefore S204 is performed, in which the mobile terminal is triggered to send a distance sensing signal. If it is judged that the mobile terminal is in a nonpreset status, that is, the mobile terminal is in the horizontal status, it is considered that the mobile terminal is away from the ear of the user, and the user intends to use the speaker of the mobile terminal to listen to the voice. Thus, S209 is performed, in which the play mode of the mobile terminal is set as a speaker play mode.

A distance sensor is provided in the mobile terminal. Specifically, the distance sensor may be set at two sides or in a groove of the earphone of the mobile terminal. The distance sensor may be an infrared sensor, a radar sensor, or any other sensors that is suitable for implement distance sensing in the mobile terminal. When it is judged at Step S203 that the mobile terminal is in the vertical status, Step 204 triggers the distance sensor of the mobile terminal to transmit a distance sensing signal, thereby detecting a distance between the user and the mobile terminal.

S205 detects whether an echoed signal returned by the user is received in a preset time. If "Yes," S206 is performed. If "No," S209 is performed.

The preset time may be set according to actual requirements, for example, may be set to 0.5 s, 1 s and so on. The preset time may be set by considering both the position status of the mobile terminal and the distance between the mobile terminal and the user, so as to accurately know the user's actual requirements for the play mode. For example, if S203 determines that the mobile terminal is in the vertical status, it is considered that the user raises the mobile terminal close to the ear of the user. If the echoed signal returned by the user is received in 0.5 s in this step, it is further verified that the mobile terminal has approached the user, so that the user's actual requirements of using the earphone of the mobile terminal to listen to the voice can be known accurately.

S206 calculates the distance between the user and the mobile terminal according to the sensing signal and the echoed signal.

S207 judges whether the distance between the user and the mobile terminal is smaller than a preset threshold. If "Yes," S208 is performed. If "No," S209 is performed.

If the distance between the user and the mobile terminal is smaller than the preset threshold, it is judged that the mobile terminal has approached the ear of the user. In such a situation, an earphone play mode is used to play the voice for protecting the eardrum of the user and enabling the user to listen to the voice clearly. Thus, S208 is performed to control the mobile terminal to enter the earphone play mode to play the voice. If the distance between the user and the mobile terminal is greater than or equal to the preset threshold, it may be determined that the distance between the mobile terminal and the user is larger. In this situation, if the earphone play mode is used to play the voice, the listening effect is affected due to the long distance. Thus, S209 is performed to control the mobile terminal to use the speaker play mode to play the voice.

S208 controls the mobile terminal to enter the earphone play mode, and then, ends the step. S209 controls the mobile terminal to enter the speaker play mode, and then, ends the step.

Through the description of the exemplary embodiments, in the present invention, the play mode of the mobile terminal is controlled based on the combination of the position status of the mobile terminal and the distance between the mobile terminal and the user. Because the influence imposed on the position status of the mobile terminal by the operation of the user on the mobile terminal is considered together with the distance between the mobile terminal and the user, the play mode of the mobile terminal can be controlled more accurately and effectively to meet the user's actual requirements for the play mode, thereby avoiding unnecessary operations and improving the intelligence of the mobile terminal.

An apparatus for controlling a play mode according to an exemplary embodiment of the present invention is described in details below with reference to FIG. 3 to FIG. 5. It should be noted that, the following apparatus can be applied in the method described above.

Figure 3:
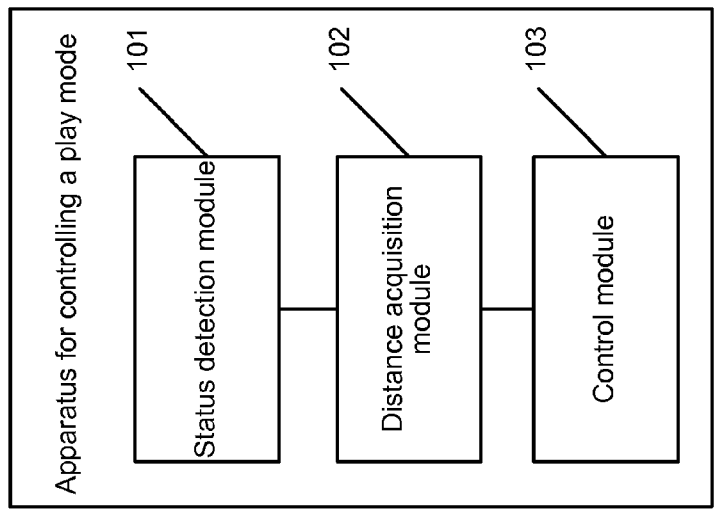
FIG. 3 is a schematic structural diagram of an apparatus for controlling a play mode according to an embodiment of the present invention.

FIG. 3 is a schematic structural diagram illustrating an apparatus for controlling a play mode according to an exemplary embodiment of the present invention. The apparatus may include a status detection module 101, a distance acquisition module 102, and a control module 103.

The status detection module 101 is configured to detect whether a mobile terminal is in a preset status according to a user's operation of the mobile terminal. The distance acquisition module 102 is configured to acquire a distance between the user and the mobile terminal if the mobile terminal is in the preset status. The control module 103 is configured to control the mobile terminal to enter an earphone play mode when the distance between the user and the mobile terminal is smaller than a preset threshold.

In this exemplary embodiment, the control module 103 is further configured to control the mobile terminal to enter a speaker play mode when it is detected the mobile terminal is in a nonpreset status, or control the mobile terminal to enter a speaker play mode when the distance between the user and mobile terminal is greater than or equal to the preset threshold.

Figure 4:
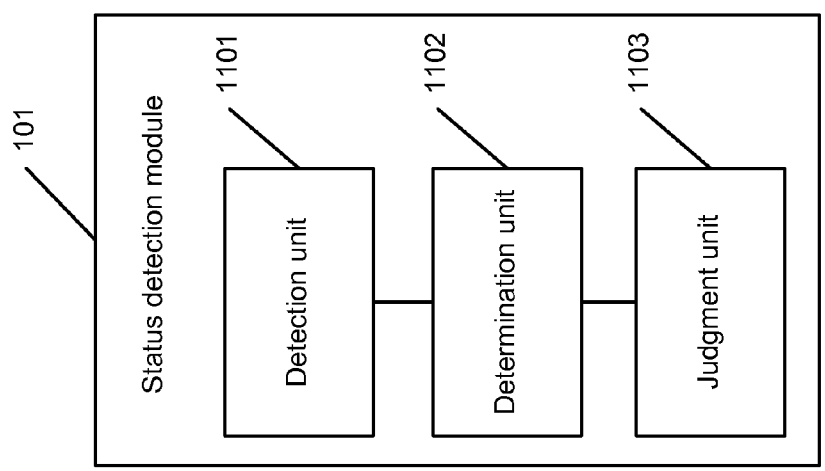
FIG. 4 is a schematic structural diagram of an embodiment of a status detection module shown in FIG. 3.

FIG. 4 is a schematic structural diagram illustrating the status detection module 101 shown in FIG. 3. The status detection module 101 may include a detection unit 1101, a determination unit 1102 and a judgment unit 1103.

The detection unit 1101 is configured to detect a gravity sensing signal generated by the mobile terminal under the operation when the user operates the mobile terminal. The determination unit 1102 is configured to determine a position status of the mobile terminal according to the detected gravity sensing signal. The judgment unit 1103 is configured to judge whether the mobile terminal is in the preset status according to the determined position status.

Figure 5:
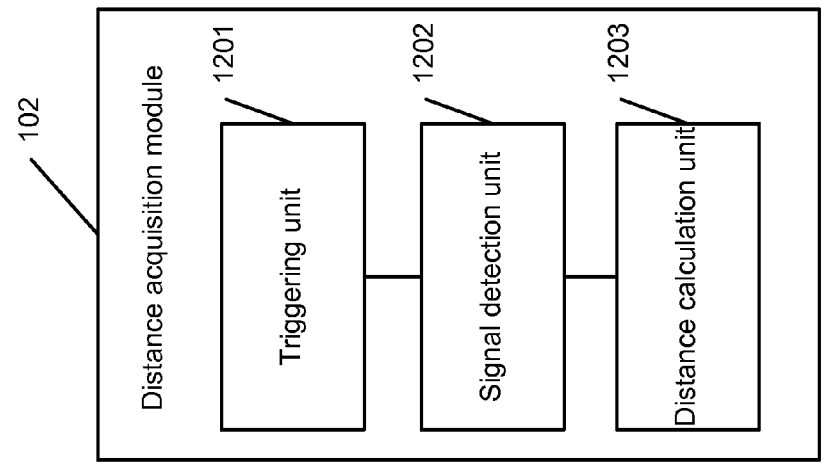
FIG. 5 is a schematic structural diagram of an embodiment of a distance acquisition module shown in FIG. 3.

FIG. 5 is a schematic structural diagram illustrating the distance acquisition module 102 shown in FIG. 3. The distance acquisition module 102 may include a triggering unit 1201, a signal detection unit 1202 and a distance calculation unit 1203.

The triggering unit 1201 is configured to trigger the mobile terminal to send a distance sensing signal. The signal detection unit 1202 is configured to detect whether an echoed signal returned by the user is received in a preset time. The distance calculation unit 1203 is configured to calculate the distance between the user and the mobile terminal according to the sensing signal and the echoed signal when the echoed signal returned by the user is received in the preset time.

In this exemplary embodiment, when the echoed signal returned by the user is not received in the preset time, the control module 103 is further configured to control the mobile terminal to enter a speaker play mode.

It should be noted that, the structures and functions of the apparatus for controlling a play mode shown in FIG. 3 to FIG. 5 may be implemented specifically according to the methods described in the above exemplary embodiments shown in FIG. 1 to FIG. 2. For the specific implementation process, reference can be made to the relevant description of the method embodiments, which is not described herein again.

Through the description of the apparatus embodiment, in the embodiment of the present invention, the play mode of the mobile terminal is controlled by taking both the position status of the mobile terminal and the distance between the mobile terminal and the user into consideration. Because the influence imposed on the position status of the mobile terminal by the user's operation of the mobile terminal is considered together with the distance between the mobile terminal and the user, the play mode of the mobile terminal can be controlled more accurately and effectively to meet the user's actual requirements for the play mode, thereby avoiding unnecessary operations and improving the intelligence of the mobile terminal.

An embodiment of the present invention further discloses a mobile terminal. The mobile terminal includes an apparatus for controlling a play mode. For the structure of the apparatus for controlling a play mode, reference can be made to the relevant description of the embodiments shown in FIG. 3 to FIG. 5, which is not described herein again. It should be noted that, the mobile terminal may be applied in the methods shown in FIG. 1 to FIG. 2.

Figure 6:
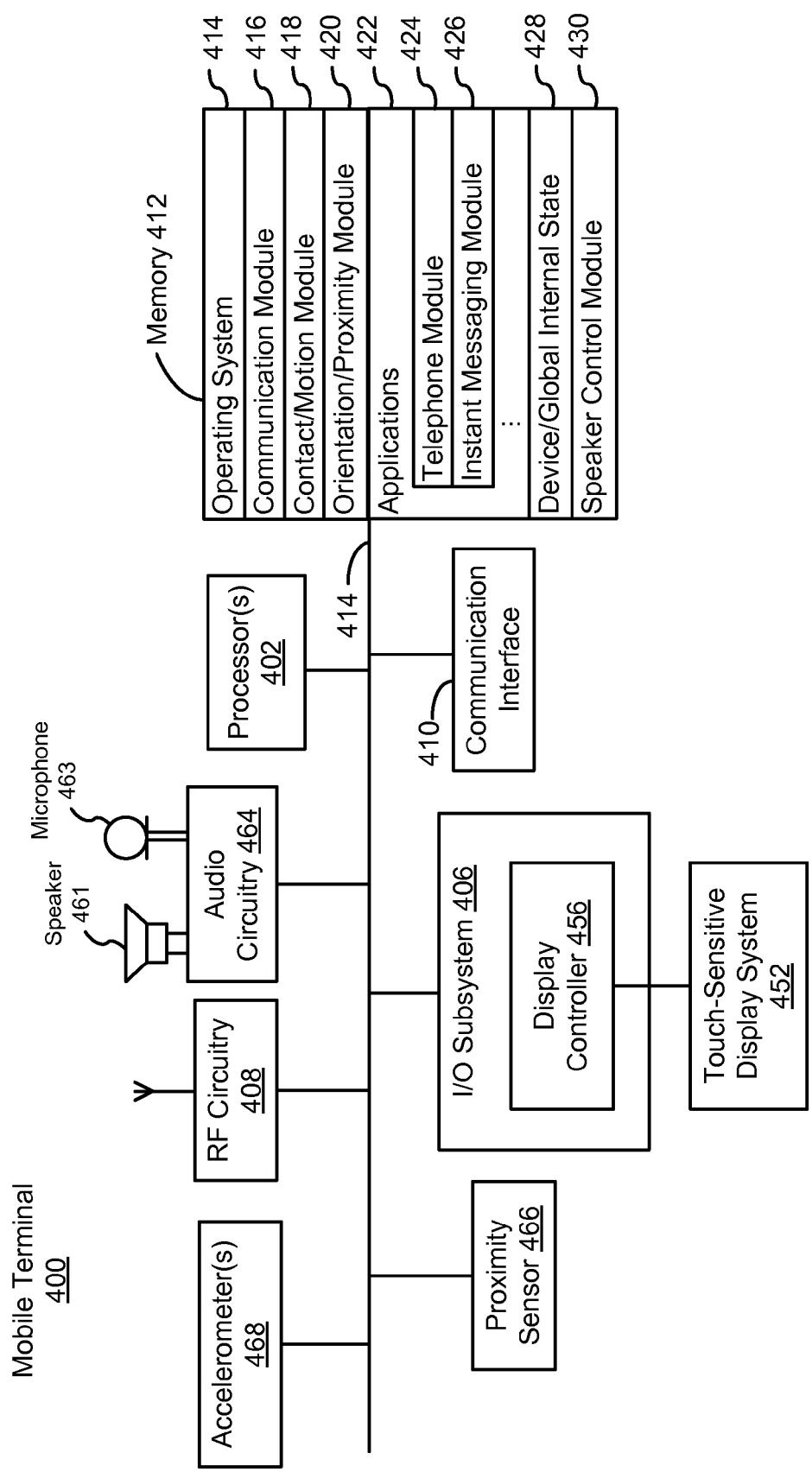
FIG. 6 is a block diagram illustrating components of a mobile terminal with a touch-sensitive display system in accordance with some embodiments of the present application.

FIG. 6 is a block diagram illustrating components of a mobile terminal 400 with a touch-sensitive display system 452 in accordance with some embodiments. The mobile terminal 400 may include memory 412 (which may include one or more non-transitory computer readable storage mediums), one or more processors 402, audio circuitry 464, speaker 461, microphone 463, input/output (I/O) subsystem 406, RF (radio frequency) circuitry 408, and one or more optical sensors 454. These components may communicate over one or more communication buses 414.

Memory 412 may include high-speed random access memory and may also include non-volatile memory, such as one or more magnetic disk storage devices, flash memory devices, or other non-volatile solid-state memory devices. The one or more processors 402 run or execute various software programs and/or sets of instructions stored in memory 412 to perform various functions for the mobile terminal 400 and to process data.

RF circuitry 408 converts electrical signals to/from electromagnetic signals and communicates with communications networks and other communications devices via the electromagnetic signals. RF circuitry 408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

Audio circuitry 464, speaker 461, and microphone 463 provide an audio interface between a user and the mobile terminal 400. Audio circuitry 464 receives audio data from the communication buses 414, converts the audio data to an electrical signal, and transmits the electrical signal to speaker 461. Speaker 461 converts the electrical signal to human-audible sound waves. Audio circuitry 464 also receives electrical signals converted by microphone 463 from sound waves. Audio circuitry 464 converts the electrical signal to audio data and transmits the audio data to the processors 402 for processing.

I/O subsystem 406 may include a display controller 456 for controlling the touch-sensitive display 452 to implement, e.g., virtual or soft buttons and one or more soft keyboards. The touch-sensitive display 452 provides an input interface and an output interface between the device and a user. Display controller 456 receives and/or sends electrical signals from/to touch screen 452. Touch screen 452 displays visual output to the user. The visual output may include graphics, text, icons, video, and any combination thereof (collectively termed "graphics"). In some embodiments, some or all of the visual output may correspond to user-interface objects.

Touch screen 452 has a touch-sensitive surface, sensor or set of sensors that accepts input from the user based on haptic and/or tactile contact. Touch screen 452 and display controller 456 (along with any associated modules and/or sets of instructions in memory 402) detect contact (and any movement or breaking of the contact) on touch screen 452 and converts the detected contact into interaction with user-interface objects (e.g., one or more soft keys, icons, web pages or images) that are displayed on touch screen 452.

The mobile terminal 400 may also include one or more proximity sensors 466. As described above, the proximity sensor turns off and disables touch screen 452 when the mobile terminal 400 is placed near the user's ear (e.g., when the user is making a phone call). The mobile terminal 400 may also include one or more accelerometers 468. In some embodiments, information is displayed on the touch screen display in a portrait view or a landscape view based on an analysis of data received from the one or more accelerometers. The mobile terminal 400 optionally includes, in addition to accelerometer(s) 468, a magnetometer (not shown) and a GPS receiver (not shown) for obtaining information concerning the location and orientation (e.g., portrait or landscape) of the mobile terminal 400.

In some embodiments, the software components stored in memory 412 include operating system 414, communication module (or set of instructions) 416, contact/motion module (or set of instructions) 418, orientation/proximity module (or set of instructions) 420, and applications (or sets of instructions) 422. Furthermore, in some embodiments memory 412 stores device/global internal state 428 including one or more of: active application state, indicating which applications, if any, are currently active; display state, indicating what applications, views or other information occupy various regions of touch screen display 452; and sensor state, including information obtained from the mobile terminal's various sensors.

Operating system 414 includes various software components and/or drivers for controlling and managing general system tasks (e.g., memory management, storage device control, power management, etc.) and facilitates communication between various hardware and software components. Communication module 416 facilitates communication with other devices over the communication buses 414 and also includes various software components for handling data received by RF circuitry 408. Contact/motion module 418 may detect contact with touch screen 452 (in conjunction with the display controller 456) and motions by the contact. Contact/motion module 418 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Orientation/proximity module 420 determines the orientation of the mobile terminal and its proximity to other objects (e.g., the user's ear or finger) and provides this information for use in various applications (e.g., to telephone module 424). Applications 422 may include the following modules (or sets of instructions), or a subset or superset thereof: telephone module 424; and instant messaging (IM) module 426. In some embodiments, the memory 412 includes a speaker control module for controlling the operation of the speaker 461 in accordance with the output signal from the accelerometers 468 and the proximity sensors 466 as described above in connection with FIGS. 1 to 5.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. Through the description of the exemplary embodiments, in the present invention, the play mode of the mobile terminal is controlled by associating the position status of the mobile terminal with the distance between the mobile terminal and the user. Because the influence imposed on the position status of the mobile terminal by the operation of the user on the mobile terminal is considered together with the distance between the mobile terminal and the user, the play mode of the mobile terminal can be controlled more accurately and effectively to meet the user's actual requirements for the play mode, thereby avoiding unnecessary operations and improving the intelligence of the mobile terminal.

Persons of ordinary skill in the art may understand that all or a part of the flow of the method according to the embodiments may be implemented by a program instructing relevant hardware. The program may be stored in a computer readable storage medium. When the program is executed, the flow of the embodiment of the foregoing method may be included. The storage medium may be a magnetic disk, an optical disk, a read-only memory (Read-Only Memory, ROM) or a random access memory (Random Access Memory, RAM) and the like.

The foregoing merely is an exemplary embodiment of the present invention, which cannot be used to limit the scope of the present invention. Therefore, the equivalent modification made based on claims of the present invention shall fall within the scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for controlling a play mode of a mobile terminal, comprising:
   at the mobile terminal having one or more processors and memory for storing programs to be executed by the one or more processors:
      detecting whether a position status of the mobile terminal is in a preset status according to an operation by a user;
      within a preset time window after the mobile terminal is in the preset status,
         generating a sensing signal using the mobile terminal and receiving an echoed signal associated with the sensing signal from the user; and
         calculating a distance between the user and the mobile terminal according to the sensing signal and the echoed signal; and
      when the distance between the user and the mobile terminal is smaller than a preset threshold, controlling the mobile terminal to enter an earphone play mode.

2. The method according to claim 1, wherein the step of detecting whether a mobile terminal is in a preset status according to an operation by a user further comprises:
   when the user operates the mobile terminal, detecting a gravity sensing signal generated by the mobile terminal under the operation;
   determining a position status of the mobile terminal according to the detected gravity sensing signal; and
   judging whether the mobile terminal is in the preset status according to the determined position status;
   wherein the position status includes a vertical status and a horizontal status, and the preset status is the vertical status.

3. The method according to claim 1, further comprising:
   when the echoed signal returned by the user is not received in the preset time window, controlling the mobile terminal to enter a speaker play mode.

4. The method according to claim 1, further comprising:
   if the mobile terminal is in a nonpreset status, controlling the mobile terminal to enter a speaker play mode; or
   if the distance between the user and the mobile terminal is greater than or equal to the preset threshold, controlling the mobile terminal to enter a speaker play mode.

5. An apparatus for controlling a play mode of a mobile terminal, comprising:
   one or more processors;
   memory; and
   a plurality of program modules stored in the memory and to be executed by the one or more processors, the plurality of program modules further including instructions for:
      detecting whether a position status of the mobile terminal is in a preset status according to an operation by a user;
      within a preset time window after the mobile terminal is in the preset status, generating a sensing signal using the mobile terminal, receiving an echoed signal associated with the sensing signal from the user, and calculating a distance between the user and the mobile terminal according to the sensing signal and the echoed signal; and
      controlling the mobile terminal to enter an earphone play mode when the distance between the user and the mobile terminal is smaller than a preset threshold.

6. The apparatus according to claim 5, wherein instruction for detecting whether the position status of the mobile terminal is in a preset status according to the operation by the user further includes instructions for:
   detecting a gravity sensing signal generated by the mobile terminal under the operation when the user operates the mobile terminal;
   determining a position status of the mobile terminal according to the detected gravity sensing signal; and
   judging whether the mobile terminal is in the preset status according to the determined position status;
   wherein the position status comprises a vertical status or a horizontal status, and the preset status is the vertical status.

7. The apparatus according to claim 5, wherein the instruction for controlling the mobile terminal to enter the earphone play mode when the distance between the user and the mobile terminal is smaller than the present threshold includes instructions for controlling the mobile terminal to enter a speaker play mode when the echoed signal returned by the user is not received in the preset time window.

8. The apparatus according to claim 5, wherein the instruction for controlling the mobile terminal to enter the earphone play mode when the distance between the user and the mobile terminal is smaller than the present threshold further includes instructions for controlling the mobile terminal to enter a speaker play mode when it is detected that the mobile terminal is in a nonpreset status; or when the distance between the user and the mobile terminal is greater than or equal to the preset threshold, controlling the mobile terminal to enter a speaker play mode.

9. A non-transitory computer readable storage medium in conjunction with a mobile terminal, the computer readable storage medium storing one or more programs for controlling a play mode of the mobile terminal, the one or more programs including instructions for:
   detecting whether a position status of the mobile terminal is in a preset status according to an operation by a user;
   within a preset time window after the mobile terminal is in the preset status,
      generating a sensing signal using the mobile terminal and receiving an echoed signal associated with the sensing signal from the user; and
      calculating a distance between the user and the mobile terminal according to the sensing signal and the echoed signal; and
   when the distance between the user and the mobile terminal is smaller than a preset threshold, controlling the mobile terminal to enter an earphone play mode.

10. The non-transitory computer readable storage medium according to claim 9, wherein the instruction for detecting whether a mobile terminal is in a preset status according to an operation by a user further includes instructions for:
   when the user operates the mobile terminal, detecting a gravity sensing signal generated by the mobile terminal under the operation;

determining a position status of the mobile terminal according to the detected gravity sensing signal; and judging whether the mobile terminal is in the preset status according to the determined position status;

wherein the position status includes a vertical status and a horizontal status, and the preset status is the vertical status.

11. The non-transitory computer readable storage medium according to claim 9, wherein the one or more programs further include instructions for: when the echoed signal returned by the user is not received in the preset time window, controlling the mobile terminal to enter a speaker play mode.

12. The non-transitory computer readable storage medium according to claim 9, wherein the one or more programs further include instructions for:

if the mobile terminal is in a nonpreset status, controlling the mobile terminal to enter a speaker play mode; or if the distance between the user and the mobile terminal is greater than or equal to the preset threshold, controlling the mobile terminal to enter a speaker play mode.

\* \* \* \* \*